G. SANFORD.
Making Bracelets.
No. 30,250.
Patented Oct. 2, 1860.
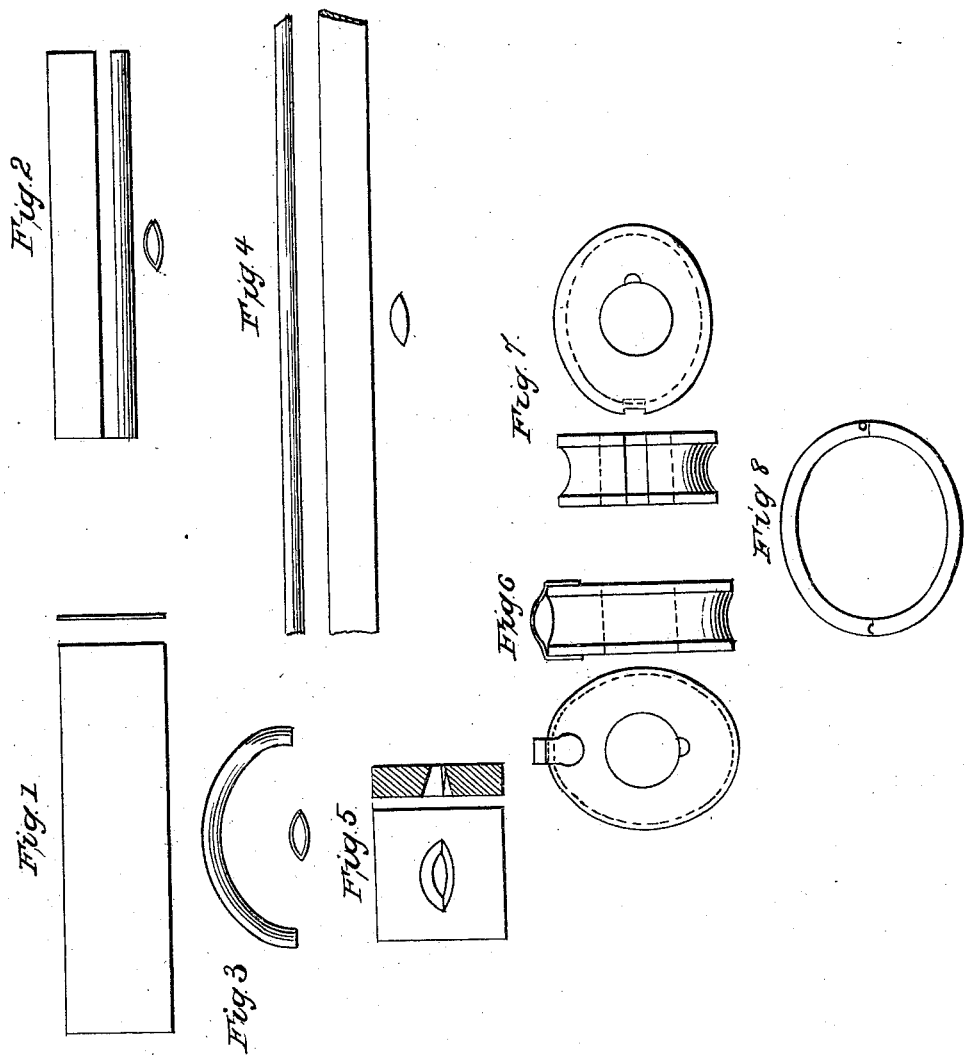

UNITED STATES PATENT OFFICE.

GEORGE SANFORD, OF PROVIDENCE, RHODE ISLAND.

MANUFACTURE OF BRACELETS.

Specification of Letters Patent No. 30,250, dated October 2, 1860.

*To all whom it may concern:*

Be it known that I, GEORGE SANFORD, of the city and county of Providence, in the State of Rhode Island, have invented a new and useful Improvement in the Method of Manufacturing Ladies' Bracelets; and I do hereby declare that the following specification, taken in connection with the drawings, making a part of the same, is a full, clear, and exact description thereof.

Figures 1, 2, and 3 show the various stages through which the bracelet passes from a strip of sheet metal (Fig. 1) to one of the half hoops of a bracelet (Fig. 3). Fig. 4 shows a wooden mandrel or former around which the metal is bent. Figs. 5, 6 and 7 are views of the various instruments employed in the process. Fig. 8 shows the finished bracelet.

The plan hitherto universally employed in manufacturing this description of ornament has been to strike up by means of a die and former the two strips of metal composing the outer and inner surfaces of each half of the bracelet, then to unite the two edges so occasioned with solder and finally to bend the two halves of the bracelet so made into the required form preparatory to adding the hinge and the fastening clasp. A difficulty has always been experienced in making the edges of the two strips composing the outer and the inner surfaces of the bracelet correspond so exactly that the soldered edge shall appear sharp and regular; and now that the majority of the stock used by manufacturers of jewelry is of the description known as "plated stock" or base metal overlaid with a thin coating of gold great care is required to make an article of this description which is sufficiently perfect to pass inspection.

My improvement is as follows: I take a strip of sheet metal (Fig. 1) of the length required to make the half hoop of a bracelet. A mandrel of hard wood or of some slightly yielding substance, the cross section of which is the same as a cross section of the bracelet band to be made (Fig. 4) with the exception that it is enough smaller to admit of the stock being bent around it is them placed upon the strip and the two side edges of the strip brought together. The strip then being around the mandrel is passed through a series of draw plate openings or dies (Fig. 5,) the effect of which is to remove all inequalities or unevenness from the surface of the strip and also to fit the two edges $b\ b$ (Fig. 2) nicely together. The other edge $a$ (same figure) being of whole stock is as true and well defined as it is possible to make it.

The stock after it leaves the draw plate being in the form shown in Fig. 2 the mandrel is withdrawn and the edges $b\ b$ are then soldered together. It is then by means of the rollers, Figs. 6 and 7, bent into the form desired, in order to make the one half of a bracelet.

The advantage which results from my improved method of manufacture is this: One side of the bracelet only requires the application of any solder at the points where the edges meet, the other edge being formed from the stock itself, while the two edges which require to be soldered are so completely kept in place from the fact that both surfaces are formed of the same piece of metal that no workman of ordinary skill in the use of solder can fail to make a perfect joint.

What I claim as my invention and desire to secure by Letters Patent is—

The improvement described in the method of making the half band for ladies' bracelets and similar articles, that is to say in forming both the outer and inner surfaces from a single piece of sheet metal substantially as specified.

GEORGE SANFORD.

Witnesses:
LEVI H. STORM,
J. W. MOORE.